W. J. BEGLEY.
TAIL LIGHT AND TRAFFIC SIGNALING DEVICE FOR AUTOMOBILES.
APPLICATION FILED MAY 12, 1917. RENEWED JULY 8, 1919.
1,336,772.
Patented Apr. 13, 1920.
2 SHEETS—SHEET 1.
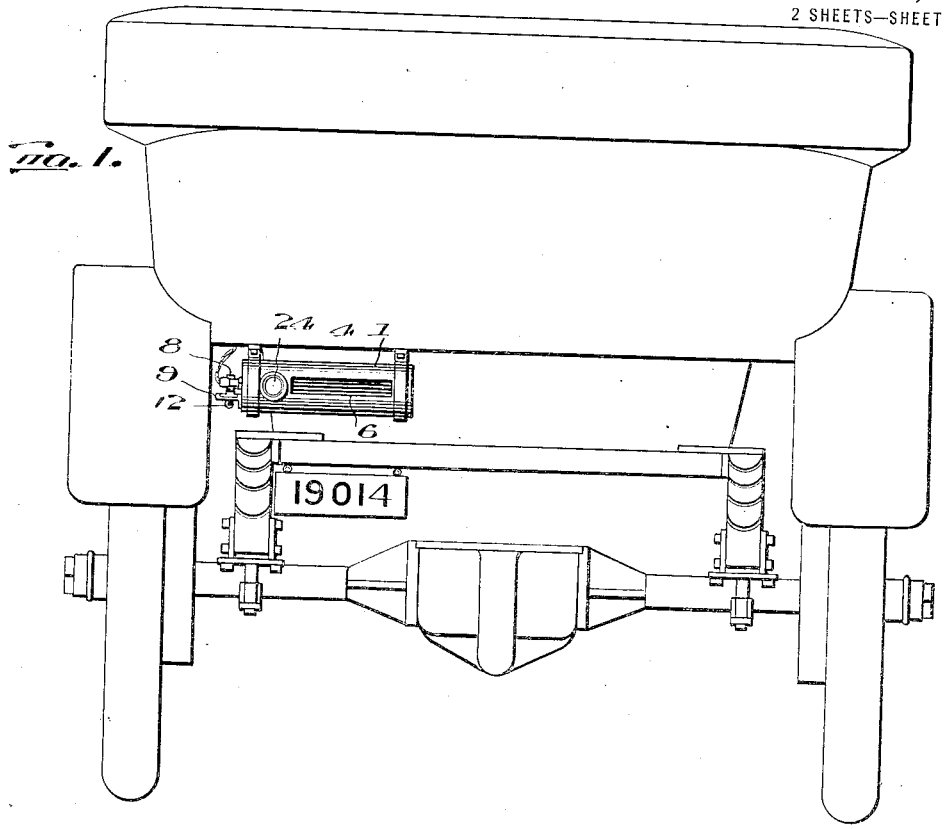
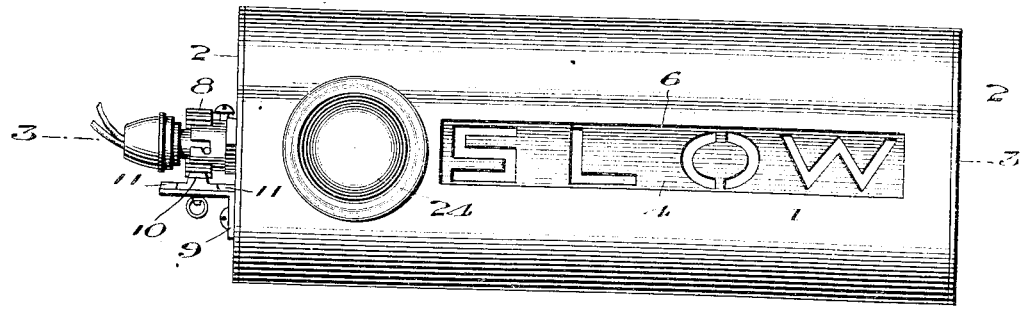

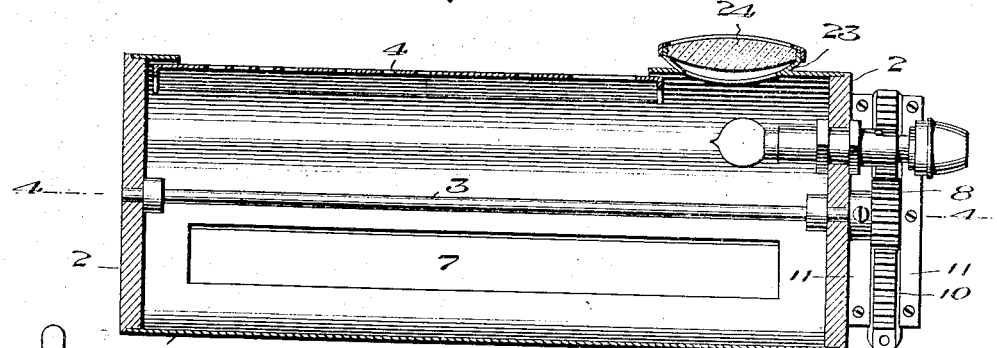
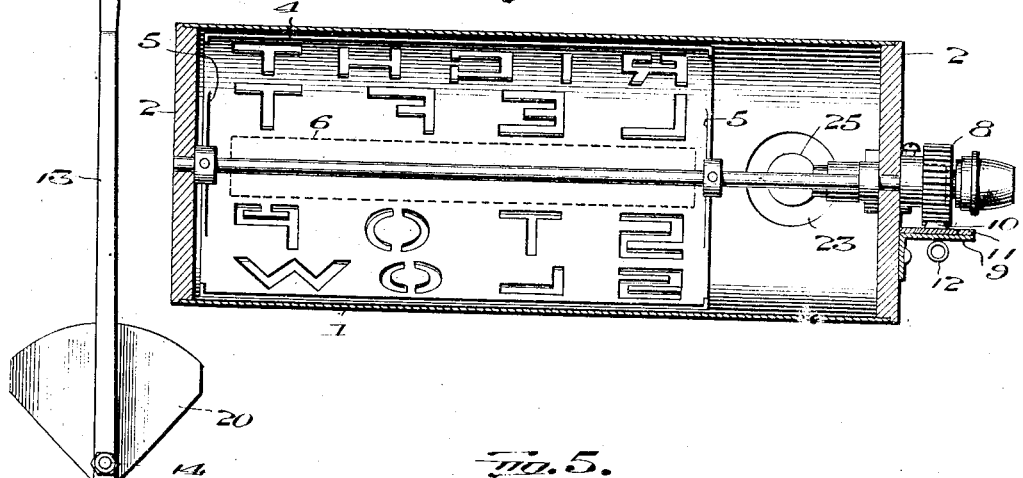
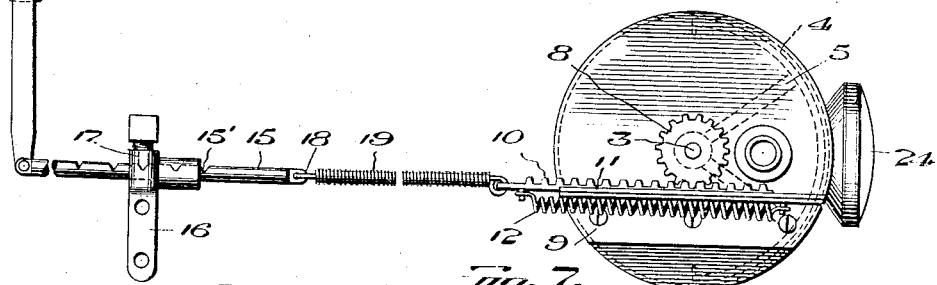
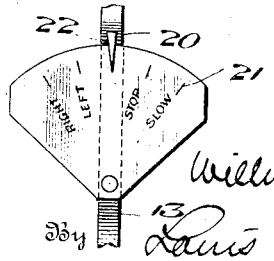
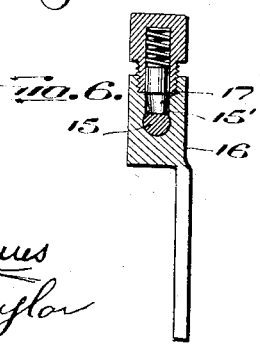

UNITED STATES PATENT OFFICE.

WILLIAM JOHN BEGLEY, OF ARVERNE, NEW YORK.

TAIL-LIGHT AND TRAFFIC-SIGNALING DEVICE FOR AUTOMOBILES.

1,336,772. Specification of Letters Patent. Patented Apr. 13, 1920.

Application filed May 12, 1917, Serial No. 168,181. Renewed July 8, 1919. Serial No. 309,478.

*To all whom it may concern:*

Be it known that I, WILLIAM JOHN BEGLEY, a citizen of the United States, residing at Arverne, in the county of Queens and State of New York, have invented certain new and useful Improvements in Tail-Lights and Traffic-Signaling Devices for Automobiles, of which the following is a specification.

This invention relates to an improved tail-light and traffic signaling device for automobiles. One object of my invention is to provide a device by which the operator of the car may conveniently signal an on-coming car whether or not he intends to stop or slow down; and, further, signal whether or not he intends to turn to the right or left.

A further object is to incorporate within this device the usual red tail-light, and to provide, in addition to that, means whereby the light within the signaling device is reflected downwardly upon the license-number of the car.

In the drawings:—

Figure 1 is a rear view of an automobile with my improved attachment applied;

Fig. 2 is an enlarged elevation of the attachment;

Fig. 3 is a longitudinal horizontal section through the device;

Fig. 4 is a longitudinal vertical section thereof;

Fig. 5 is a side elevation showing the operating mechanism, and the relative position of the actuating mechanism;

Fig. 6 is an enlarged transverse section through the bracket 16 and rod 15, showing the detent pawl.

Fig. 7 is a detail view indicating the plate.

1, indicates a cylindrical casing closed at its ends by heads 2, 2, which are adapted to support, centrally thereof, a spindle 3. Rotatably mounted upon the spindle is a segmental shutter 4, supported at either end by suitable spiders or supporting frames 5. This shutter has stenciled or otherwise indicated thereon the words "Slow," "Stop," "Left" and "Right." If desirable, these symbols may be backed up by suitable material which would allow the penetration of the light therethrough, thereby rendering the words visible. These symbols are preferably arranged in pairs, "Stop" and "Slow," and "Left" and "Right," leaving therebetween a blank or neutral space. By this arrangement, any unnecessary movement of the shutter is obviated, inasmuch as it can be readily rotated in either direction to the particular symbol which it is desired to expose. A suitable opening 6 is provided in the outer cylindrical casing to permit of the proper exposure of these symbols. Still another opening 7 is arranged preferably on the lower side of the outer cylindrical casing, which permits of a ray of light being thrown upon the license-number of the car placed preferably therebeneath.

As a means for rotating the inner segmental shutter, a pinion 8 is secured to the inner end of the spindle 3, projecting outwardly from the head 2. Immovably secured to the head is a suitable support 9, on which is slidably mounted a toothed rack 10, which is suitably guided thereon by guide-members 11. Secured to the outer end of this toothed rack is a spring 12, the other end of which is suitably attached to the supporting member 9.

Arranged at a suitable point within reach of the operator is a control-lever 13, fulcrumed as at 14. Attached to the extreme lower end of this control lever is a rod 15, provided with notches 15', mounted within a bracket 16 attached to the body of the car. This rod is preferably provided with as many notches as there are symbols or indications on the segmental shutter, which notches are adapted to register with a vertically-arranged spring pressed plunger 17 arranged in the bracket 16.

The outer end of the toothed rack 10 is connected to the extreme outer end of the notched rod 15 by means of a suitable wire 18. This wire is preferably housed by a coiled wire or other suitable housing 19, which is of sufficient stiffness to prevent the buckling of the wire leading from the above-mentioned point. As will be seen, the notches 15' are so spaced as to determine the movement necessary to cause the proper registration of the symbols with the opening 6 in the cylindrical casing to properly expose the symbols to view.

As a further convenience to the operator, a plate 20 is provided with graduations 21, which are labeled in accordance with the symbols on the segmental shutter. The operating lever 13 is further provided with a pointer 22, which is likewise adapted to register with the graduations upon the plate when the lever has attained the proper position.

Arranged in the extreme outer end of the cylindrical casing is a tail-light 23, which is provided with the usual red lens 24, in the back of which is arranged the electric light 25, which is suitably supported within the head 2 of the casing. This light may be connected in any convenient way to a source of supply. This light acts in the triple capacity of illuminating the tail-light and as the traffic-signal and the license-number.

The operation is as follows:—The normal position of the parts is that indicated in Fig. 5, in which the control lever 13 is in a neutral position, and the opening 6 in cylindrical casing 1 is closed by the segmental shutter 4. When the driver wishes to stop, he moves the control lever to that position, whereupon the segmental shutter 4 is rotated in the proper direction to cause the symbol "Stop" to register with the opening 6, thereby warning the driver of the vehicle following to stop, or slow down. The same operation is repeated when the driver intends to slow down, or turn to the right or left.

Thus it will be seen that I have provided a very effective and simple means for accomplishing the required result.

I claim.

1. A tail-light and traffic signaling device containing a casing having two openings and a bull's-eye, an identification plate adjacent to one opening, an illuminating means arranged so that its rays shine through the tail-light and the openings, and a transparent means having signaling indicia thereon and movably located between the illuminating means and one of said openings only, and at one side of the other opening, whereby the rays of light pass through the transparent means to the first said opening, the rays of light to the other opening being unobstructed, whereby the light therethrough is always constant upon the identification plate.

2. A tail-light and traffic signaling device comprising a fixed casing, which has a bull's-eye and two openings, and provided with an illuminating device therein, rays from which shine constantly through the bull's-eye and the two openings, a transparent device having signaling indicia thereon, movable across one opening only, whereby the indicia thereon is rendered readable through said opening and the rays of light through the other opening are constant and unobstructed, and an identification plate adapted to be located in position with respect to said last-named opening to receive the constant rays of light from the illuminating means thereon.

3. A tail-light and traffic signaling device containing a fixed casing which has a bull's-eye and two openings located a distance apart approximately the equivalent of a quarter circle, an illuminating means, the rays of which shine within said casing through the bull's-eye and the openings, an identification plate adjacent to one of said openings, and a segmental stencil shutter movably located between the illuminating means and one opening only, whereby the light rays shine constantly and unobstructedly upon the identification plate.

4. The combination with a casing having a bull's-eye and two openings formed therein and extending longitudinally thereof, an identification plate adjacent one opening, a light located within the casing, the rays of which extend constantly and unobstructedly through the bull's-eye and one opening to the identification plate, and a rock-shaft journaled in the ends of the casing carrying a segmental shutter movably located between the light and one of the openings only, and having indicia thereon arranged in pairs with a blank portion therebetween which normally lies opposite one of said openings in the casing.

5. The combination with a casing having a bull's-eye and two openings formed therein and extending longitudinally thereof, an illuminating means, the rays of which extend constantly through said bull's-eye and unobstructedly through one of said openings, an identification plate adapted to be located in proximity to said last named opening to receive the constant rays of light from said illuminating means, and a rock-shaft journaled in the casing and carrying a segmental drum having indicia stenciled therein arranged in pairs leaving a blank or neutral space between said pairs, which neutral space rests normally opposite the other opening in the casing.

In testimony whereof I affix my signature.

WILLIAM JOHN BEGLEY.